US008670973B2

(12) United States Patent
Chen et al.

(10) Patent No.: US 8,670,973 B2
(45) Date of Patent: Mar. 11, 2014

(54) LANGUAGE TRANSLATION REUSE IN DIFFERENT SYSTEMS

(75) Inventors: Danny Y. Chen, Austin, TX (US);
Fabian F. Morgan, Austin, TX (US);
Sandra J. Schlosser, Austin, TX (US);
Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/883,645

(22) Filed: Sep. 16, 2010

(65) Prior Publication Data

US 2012/0072201 A1    Mar. 22, 2012

(51) Int. Cl.
G06F 17/28    (2006.01)

(52) U.S. Cl.
USPC ............... 704/2; 704/1; 704/5; 704/7; 704/8; 704/9; 707/706; 707/707; 707/708; 715/264

(58) Field of Classification Search
USPC ............... 704/1–10; 707/706–708; 715/264
See application file for complete search history.

(56) References Cited

U.S. PATENT DOCUMENTS

| 6,598,015 | B1 | 7/2003 | Peterson et al. |
|---|---|---|---|
| 6,920,630 | B2 | 7/2005 | Jackson |
| 6,937,974 | B1 | 8/2005 | D'Agostini |
| 7,020,601 | B1 | 3/2006 | Hummel et al. |
| 7,110,938 | B1 | 9/2006 | Cheng et al. |
| 7,139,696 | B2 | 11/2006 | Tokieda et al. |
| 7,231,600 | B2 | 6/2007 | Zhou et al. |
| 7,624,384 | B2 | 11/2009 | Zhang et al. |
| 7,627,855 | B2 | 12/2009 | Inoue et al. |
| 7,680,646 | B2 | 3/2010 | Lux-pogodalla |
| 2003/0004702 | A1 | 1/2003 | Higinbotham |
| 2003/0036976 | A1 | 2/2003 | De Ruwe |
| 2003/0126559 | A1* | 7/2003 | Fuhrmann ..................... 715/513 |
| 2005/0171944 | A1 | 8/2005 | Palmquist |

(Continued)

FOREIGN PATENT DOCUMENTS

| EP | 0797155 | A2 | 9/1997 |
|---|---|---|---|
| EP | 07979155 | A2 | 9/1997 |

(Continued)

OTHER PUBLICATIONS

Muldner T.; Internationalization of Websites; Item: Article; Date: Jun. 21-26, 2004; pp. 2040-2047; Jodrey School of Computer Science, Acadia University; Canada.

(Continued)

*Primary Examiner* — Lamont Spooner
(74) *Attorney, Agent, or Firm* — Arthur Samodovitz; Robert C. Rolnik

(57) ABSTRACT

An account system obtains a first translation file associated with it. The account system obtains a second translation file from a second account system, wherein the second account system is a data processing system. The account system determines whether a third account system has a third translation file with untranslated terms. The account system obtains the third translation file from the third account system, responding to a determination that the third account system has the third translation file with untranslated terms. The account system, responding to a determination that the third account system has the third translation file with untranslated terms, forms a comprehensive file from at least two files selected from the group consisting of the first translation file, second and/or third translation files. The account system translates the comprehensive file to form a translated file.

20 Claims, 6 Drawing Sheets

(56) References Cited

U.S. PATENT DOCUMENTS

| | | |
|---|---|---|
| 2005/0197827 A1 | 9/2005 | Ross et al. |
| 2006/0116865 A1 | 6/2006 | Cheng et al. |
| 2007/0033579 A1 | 2/2007 | Andrews et al. |
| 2007/0265827 A1 | 11/2007 | Wall et al. |
| 2008/0077395 A1 | 3/2008 | Lancaster et al. |
| 2008/0120088 A1 | 5/2008 | Schurig |
| 2008/0120090 A1* | 5/2008 | Schurig .............................. 704/2 |
| 2008/0162114 A1 | 7/2008 | Torres-rocca et al. |
| 2009/0070094 A1 | 3/2009 | Best et al. |
| 2009/0106017 A1 | 4/2009 | D'agostini |
| 2009/0248393 A1 | 10/2009 | Tomko et al. |
| 2009/0282394 A1 | 11/2009 | Raj |
| 2010/0057434 A1 | 3/2010 | Konno |
| 2010/0250232 A1* | 9/2010 | Nagase .............................. 704/2 |
| 2011/0320413 A1* | 12/2011 | Roman et al. ................. 707/690 |

FOREIGN PATENT DOCUMENTS

| | | |
|---|---|---|
| JP | 4160473 A | 6/1992 |
| JP | 4160473 A | 9/1992 |
| JP | 4287166 A | 10/1992 |
| JP | 2009146196 A | 7/2009 |

OTHER PUBLICATIONS

Lewis D.; Web Service Integration for Next Generation Localisation; Date: Jun. 2009; pp. 47-55; Centre for Next Generation Localisation, Trinity College; Ireland.

Barrachina S.; Statistical Approaches to Computer-Assisted Translation; Computational Linguistics; vol. 35, Issue 1 (Mar. 2009); ISSN:0891-2017.

Ung D; Machine Adaptable Dynamic Binary Translation; Workshop on Dynamic and Adaptive Compilation and Optimization; pp. 41-51; (2009); ISBN:1-58113-241-7.

Wu J; TotalRecall: A Bilingual Concordance for Computer Assisted Translation and Language Learning; Annual Meeting of the ACL; pp. 201-204; (2009); ISBN: 0-111-456789.

* cited by examiner

*FIG. 2A*

```
<?xml version="1.0" encoding="utf-8"?>                              200                    235
  <DATABASE src="jdbc:db2://ipaddress:port/dbName">
    <TABLE name="MAXATTRIBUTE">
      <RECORD ATTRIBUTENAME="DFLTGROUP" OBJECTNAME="ACCOUNTDEFAULTS">
                                    233
        <TEXT column="REMARKS" lang="EN" maxlength="4000">Group type</TEXT>      } 241
240   { <TEXT column="REMARKS" lang="FR" maxlength="4000">Type de groupe</TEXT>  } 243
        <TEXT column="TITLE" lang="EN" maxlength="80">Group Type</TEXT>          } 245
                                       234
        <TEXT column="TITLE" lang="FR" maxlength="80">Type de groupe</TEXT>      } 247
      </RECORD>
    </TABLE>
  </DATABASE>
```

*FIG. 2B*                                                           245

```
<?xml version="1.0" encoding="utf-8"?>
 <DATABASE src="jdbc:db2://ipaddress:port/dbName">
  <TABLE name="MAXATTRIBUTE">
   <RECORD ATTRIBUTENAME="ITDREGION" OBJECTNAME="ADDRESS">
     <TEXT column="REMARKS" lang="EN" maxlength="4000">Region</TEXT>
     <TEXT column="REMARKS" lang="FR" maxlength="4000">null</TEXT>
     <TEXT column="POPUP" lang="EN" maxlength="4000">Word</TEXT>
     <TEXT column="POPUP" lang="FR" maxlength="4000">mot</TEXT>
     <TEXT column="TITLE" lang="EN" maxlength="80">Region</TEXT>
     <TEXT column="TITLE" lang="FR" maxlength="80">null</TEXT>
   </RECORD>
  </TABLE>
 </DATABASE>
```

*FIG. 2C*                                                           250

```
<?xml version="1.0" encoding="utf-8"?>
 <DATABASE src="jdbc:db2://ipaddress:port/dbName">
  <TABLE name="MAXATTRIBUTE">
   <RECORD ATTRIBUTENAME="ITDREGION" OBJECTNAME="ADDRESS">
     <TEXT column="REMARKS" lang="EN" maxlength="4000">Region</TEXT>
     <TEXT column="REMARKS" lang="FR" maxlength="4000">null</TEXT>
     <TEXT column="TITLE" lang="EN" maxlength="80">Region</TEXT>        251
     <TEXT column="TITLE" lang="FR" maxlength="80">null</TEXT>
   </RECORD>                                                            255
  </TABLE>
 </DATABASE>
```

LANGUAGE TRANSLATION REUSE IN DIFFERENT SYSTEMS

BACKGROUND OF THE INVENTION

1. Field of the Invention

The present invention relates generally to a computer implemented method, data processing system and computer program product for translating terms for localization. More specifically, the present invention relates to aggregating terms to be translated from among multiple systems for a unified translation session.

2. Description of the Related Art

Developers of modern Information Technology (IT) equipment leverage software and other files by developing the logic for such software using terminology preferred by the culture of the manufacturer. In other words, software can depend on files that provide contextual help, as well as define strings for menus, buttons, and other user interface features.

The dependency among files can extend to multiple software development projects. This arrangement, where language files are updated to reflect a foreign customer's preferred language, is called localization. Localization takes place at a final step in a development cycle. However, for efficiency purposes, it can be advantageous to offer a larger extent of terms to translate earlier in the cycle in order to avoid distribution bottlenecks globally.

Where multiple teams of a common business develop on different account systems, translation can be performed in a piecemeal fashion. In other words, each team may independently contract with a translator and seek translation on a handful of terms. Such an approach, of translation on such a small scale, may cause inefficiencies as compared, for example, with larger pools of terms to be translated.

SUMMARY OF THE INVENTION

The present invention provides a computer implemented method, data processing system, and computer program product for providing reuse of translated data between systems by operation of an account system. The account system obtains a first translation file associated with a first account system. The account system obtains, via a packet network, a second translation file from a second account system, wherein the second account system is a data processing system. The account system determines whether a third account system has a third translation file having untranslated terms. The account system obtains the third translation file from the third account system, responsive to a determination that the third account system has the third translation file with untranslated terms. The account system, responsive to a determination that the third account system has the third translation file with untranslated terms, forms a comprehensive file from at least two files selected from the group consisting of the first translation file, second translation file and a third translation file. The comprehensive file includes only one of each key. The account system translates the comprehensive file to form a translated file and sends the translated file to the second account system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2A is a translation file in accordance with an illustrative embodiment of the invention;

FIG. 2B is a translation file in accordance with an illustrative embodiment of the invention;

FIG. 2C is a translation file including untranslated terms in accordance with an illustrative embodiment of the invention;

DETAILED DESCRIPTION OF THE PREFERRED EMBODIMENT

Figure 1:
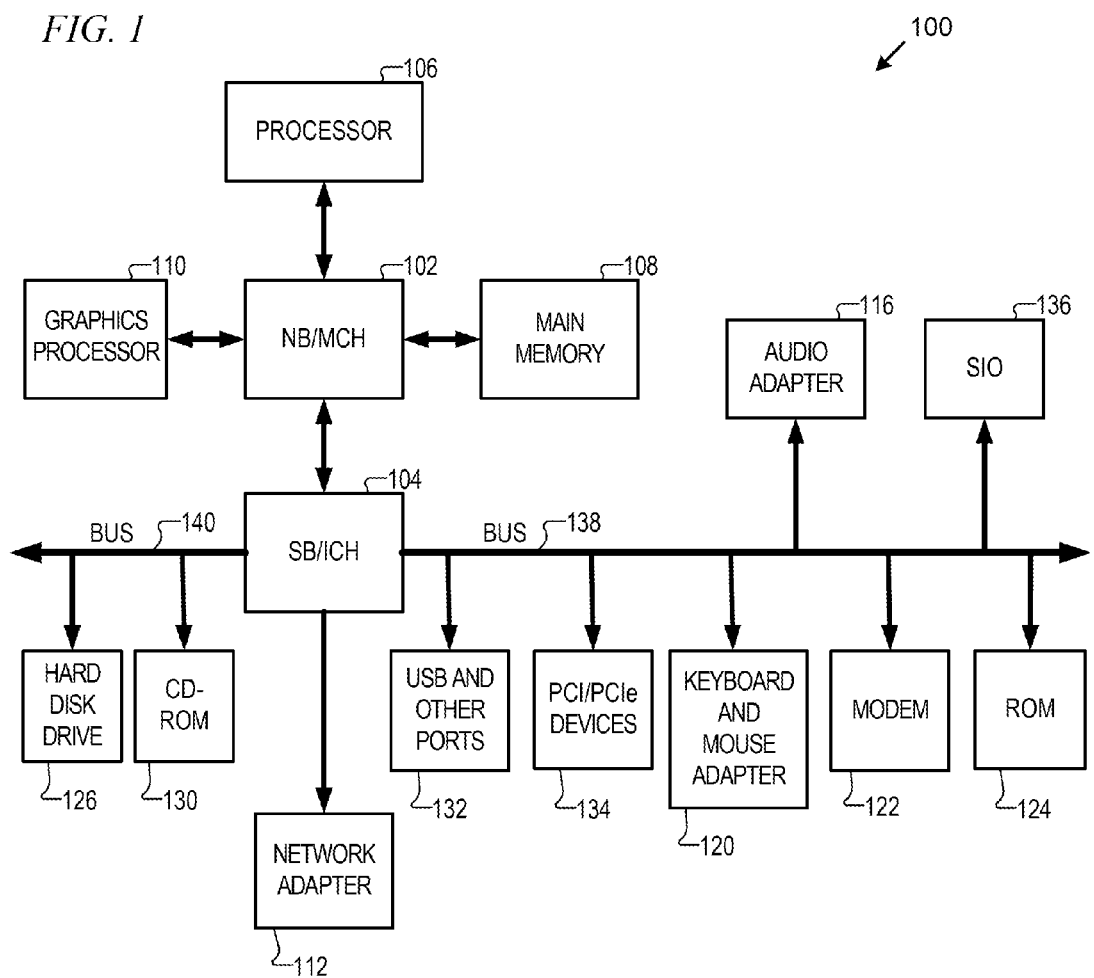
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108 and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft® and Windows® are trademarks of Microsoft Corporation in the United States, other countries, or both. An object oriented programming system, such as the Java™ programming system, may run in conjunction with the operating system and provides calls to the operating system from Java programs or applications executing on data processing system 100. Java is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable device(s) having computer readable program code embodied thereon.

Any combination of one or more computer readable device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable tangible storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable tangible storage device may be any tangible device that can store a program for use by or in connection with an instruction execution system, apparatus, or device. The term "computer-readable storage device" does not encompass a signal propagation media such as a copper transmission cable, an optical transmission fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Illustrative embodiments may trigger when one project among several projects is ready to translate files from a manufacturer's language to the language of a customer. The project, operating through its account system, may solicit or otherwise obtain, translation files of peer projects using peer account systems. All terms not yet translated among all peer account systems can be aggregated to a common file, which may be forwarded to a translation center for translating. After completing translation, the aggregating account system may receive a translated file and distribute translated terms among its peers. A translation center is a source for translations of text used in products that execute software. Translations can be performed by staff who work on terminals. Alternatively, the translation center may use files stored within, or dictionary resources found externally, to automatically develop translations for terms that lack translations.

FIG. 2A is a translation file in accordance with an illustrative embodiment of the invention. The translation file can be associated to an account system. An account system is a computer or other data processing system that houses information of some sort that is translated or needs to be translated. The data includes, but is not limited to, application data such as menus, buttons, etc. A translation file is a file that contains at least one triplet, where the triplet includes an object name (prefaced by the string OBJECTNAME=), a key and a translation token. The translation file may be partially translated data. In other words, partially translated data may mean that among a group of attributes, one or more attributes lack any translation for a key or lack some translations for a key.

Translation file 200 is made up of an attribute, which is associated with an object. An object can be a field that provides contextual information about a manner in which a term is used within equipment controlled with software. An object name is a name of the object or context in which the object is used. ACCOUNTDEFAULTS 235 is an example of the object.

Record 240 can include multiple keys. A key is a term written in the preferred language of the manufacturer's staff combined with a column descriptor, an attribute name descriptor, and an object name descriptor. A descriptor is the specific instance of an attribute. Usually, the descriptor is placed on the right-hand side of an equal sign and enclosed in quotes, while the name of the attribute is placed to the left of the equal sign. A key may be an English key. An English key is written substantially in English. In other words, the XML tags that include the attribute name, object name, and column can enclose a term or a key value, such as Group type 233.

Thus, the language element part of the key may be in English. "Substantially in English" means that a term or key value uses words in English dictionaries, common misspellings of English, and words in technical dictionaries and glossaries used by English speakers, including abbreviations and acronyms. Each key is associated with at least one language other than the preferred language of the manufacturer. Record 240 has two keys. A first key is the key defined by "DFLTGROUP", "ACCOUNTDEFAULTS", "REMARKS", and the term, "Group type". A second key is defined by DFLTGROUP, ACCOUNTDEFAULTS, TITLE, and the term, "Group type". The combination of values for an OBJECTNAME, ATTRIBUTENAME, and column together with the term can comprise a key. In the examples of the two keys, the keys share a common OBJECTNAME and ATTRIBUTENAME.

A language element is assigned to a key when the language element identifies the language (e.g. by 2-letter country code), and a translation token is associated with the language element. A language element, in the translation file, is an XML tag that includes a string prefaced by "lang=". The language element includes a language identifier, for example, "EN" for English. The combination of the key to a language identifier, which matches the manufacturer's language, forms an instance of the key. A translation token is a string, selected by convention, to identify that no correct value exists for the key in the language of the language element. Language elements include the lines 241, 243, 245, and 247. Thus, language element 243 is associated to the key, DFLTGROUP/ACCOUNTDEFAULTS/REMARKS/Group type 233 while language element 247 is associated to the key, DFLTGROUP/ACCOUNTDEFAULTS/TITLE/Group type 234. These keys, respectively, enclose the key values "Group type" and "Group type" with XML tags having attributes of DFLTGROUP/ACCOUNTDEFAULTS/REMARKS, and DFLTGROUP/ACCOUNTDEFAULTS/TITLE.

Each key may be associated with one or more translations. A translation is a language element associated with a key such that the language element, rather than having a translation token, instead has a word or phrase in a targeted language. The word or phrase is any word or words that are in the foreign language's dictionaries or technical manuals, and may be abbreviations or contractions. In instances where the foreign language has no suitable translation for the key, a translator can use the key value itself as an ad hoc translation for terms not present in the foreign language. As such, the translator may adopt the key value and add the word as a neologism in the target language. In any case, where the translation token is replaced, a translation is made available. For example, language element 243 is associated to the key present in language element 241, namely "DFLTGROUP/ACCOUNTDEFAULTS/REMARKS/Group type". In this case, language element 243 contains the string, "Type de groupe", a French translation of "group type".

Process steps, described in FIG. 4 below, may be used to locate two files that use the same key value. The first file may have a translation for the key value, while the second file may have only a translation token associated with the key value. Accordingly, the process may copy the translation from the first file to the second file.

FIG. 2B is a clearly marked translation file in accordance with an illustrative embodiment of the invention. Translation file 245 can be sent to the translation center in order to obtain replacements for each translation token, 'null'.

FIG. 2C is a translation file including untranslated terms in accordance with an illustrative embodiment of the invention. An untranslated term is a term that is associated with a language element that has a translation token occupying the position of the translation for the language identified by the "lang" XML tag. In translation file 250, null 251 is the translation token for the French translation corresponding to the key "ITDREGION", "ADDRESS", and "REMARKS". Null 255 is the translation token for the French translation corresponding to the keys "ITDREGION", "ADDRESS", and "TITLE". In translation file 250, there are two untranslated terms. The first untranslated term is the untranslated term for French corresponding to the English instance of the key including "REMARKS" and key value, "Region". The second untranslated term is the untranslated term for French corresponding to the English instance of the key including "TITLE" and key value "Region".

An instance of a key is a unique combination of "ATTRIBUTENAME", "OBJECTNAME", column, and a key value. Translation file 250 has one instance of a key in the form of "ITDREGION", "ADDRESS", "REMARKS" and "Region". Translation file 250 has a second instance of a key in the form of "ITDREGION", "ADDRESS", "TITLE" and "Region". Translation file 250 includes two instances of a key. Both keys in this illustration have a key value associated with a translation token, for example, null 251 and 255.

Figure 3:
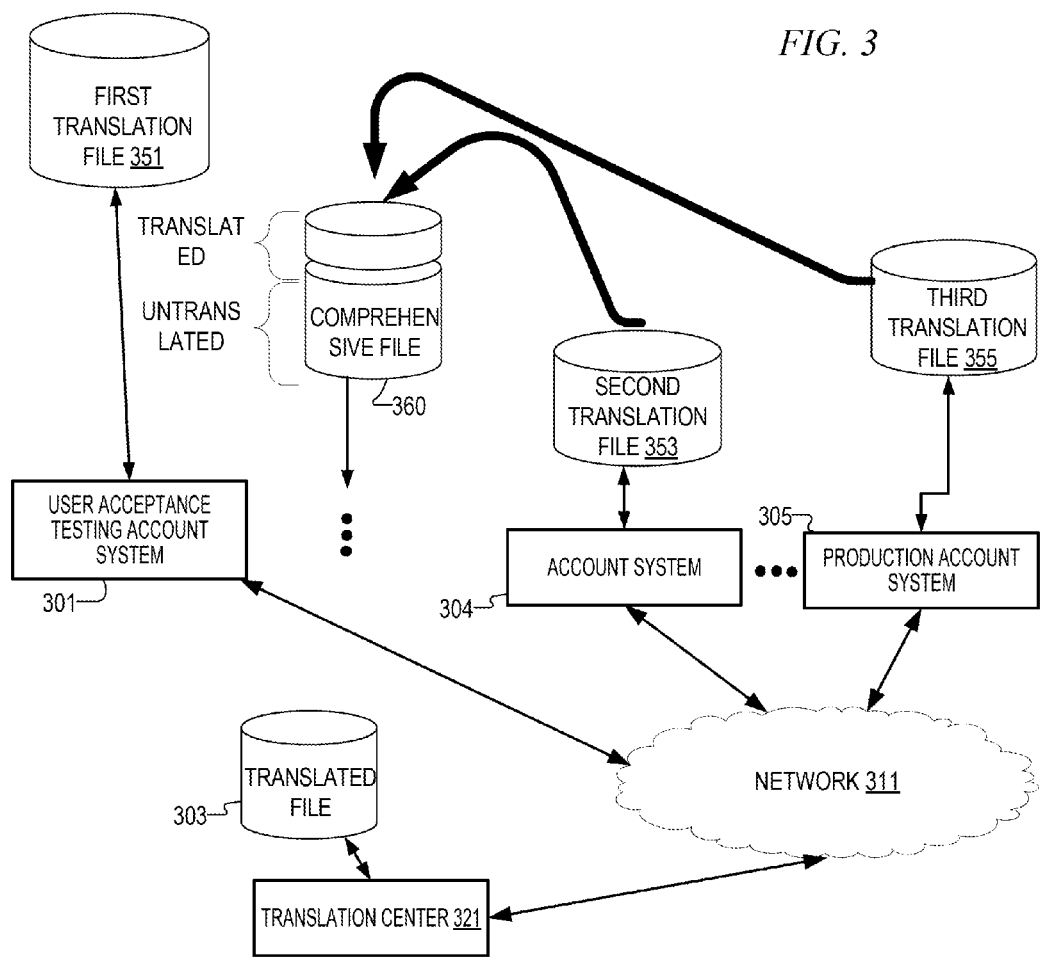
FIG. 3 is a system diagram of multiple data processing systems arranged in accordance with an illustrative embodiment of the invention.

FIG. 3 is a system diagram of multiple data processing systems arranged in accordance with an illustrative embodiment of the invention. An account system, for example, user acceptance testing account system 301, may access and control a first translation file 351. Account system 304 may access and control a second translation file 353. Production account system 305 may access and control a third translation file 355. User acceptance testing account system 301, account system 304, and production account system 305 may each be a data processing system as described in data processing system 100 of FIG. 1. These data processing systems may use network 311 to exchange data among themselves, as well as with translation center 321. Operation of one or more processes of the embodiments may cause user acceptance testing account system 301 to obtain the first translation file 351 and solicit account system 304 and production account system 305 to conditionally provide the second translation file 353 and third translation file 355 to the user acceptance testing account system 301. User acceptance testing account system 301 may consolidate each of the translation files into a comprehensive file, such as comprehensive file 360.

A comprehensive file is a file that results after combining two or more translation files that originate from different account systems including the account system that forms the comprehensive file. A comprehensive file can be a heterogeneous comprehensive file, in which case the file has some translated keys and some keys that lack at least one translation. Translation file 245 of FIG. 2B is an example of a heterogeneous comprehensive file. A comprehensive file can be a homogenous comprehensive file, in which case the file is comprised only of keys that are missing at least one translation. Comprehensive file 360 is a heterogeneous comprehensive file. Comprehensive file 360 does not include terms or keys of the first translation file 351, since first translation file 351 is made up entirely of translated terms or keys. The comprehensive file may be transmitted to a translation center.

Translation center 321 may respond to the transmittal of comprehensive files by returning a translated file 303 to the sender. In this case, translation center 321 may send translated file 303 to user acceptance testing account system 301 via network 311.

Figure 4:
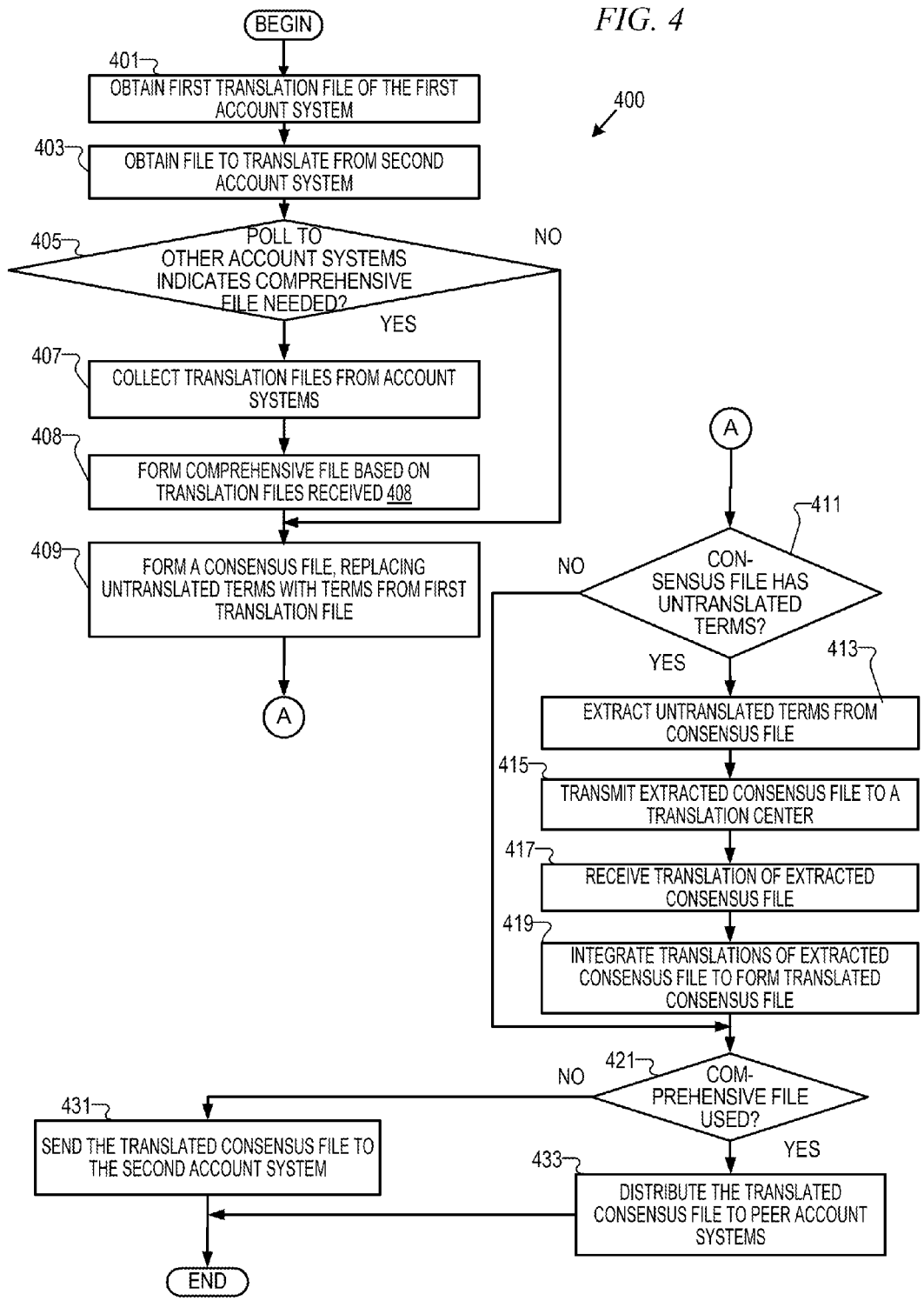
FIG. 4 is a flowchart for a process of forming a translated file in accordance with an illustrative embodiment of the invention.

FIG. 4 is a flowchart for a process of forming a translated file in accordance with an illustrative embodiment of the invention. Initially, an account system may obtain a first translation file of the first account system (step 401). Flowchart 400 can be performed in response to receiving translations from a source outside the first account system. In this case, the first account system can be user acceptance testing account system 301 of FIG. 3. Next, the first account system may obtain a file to translate from a second account system (step 403).

Next, the first account system may poll to other account systems to determine if such systems indicate a comprehensive file is needed (step 405). This step can be performed by transmitting the first translation file to the other systems, in this case account system 304 and production system 355, of FIG. 3. If these systems both respond by transmitting their translation files to the first account system, then the determination at step 405 is positive. If fewer than two systems respond with translation files, then the determination at step 405 is negative.

A positive determination may cause the first account system to collect translation files from account systems that transmitted translation files (step 407). The first account system may determine directly or indirectly that the third account system has a third translation file having untranslated terms. Such untranslated files may be determined to be transmitted in response to the first account system polling these account systems at step 405. Accordingly, the file or files, received at the first account system, are determined to be untranslated files. Next, the first account system may form a comprehensive file based on the received translation files (step 408). Only account systems that have translation files that lack at least one translation for a language element will respond to the first account system. As explained above, the comprehensive file is made up of untranslated terms corresponding to keys of the account systems remote from the first account system, for example, the account system 304 and production system 305 of FIG. 3.

Next, the first account system compares each untranslated term to form a consensus file (step 409). A consensus file is a file derived from the translation files associated with two or more account systems. In other words, the first translation file is combined with a translation file of a peer account system, and optionally a second translation file of a second peer account system. In each case, the resulting file is a consensus file. However, when the translation file is combined with translation files of two peer account systems, the resulting file is both a consensus file and a comprehensive file. The first account system can replace, in the consensus file, any language tokens, or placeholders (nulls) in language elements according to translated values found in the first translation file. In other words, where the first translation file provides a translation for a term or key that is not present among the peer translation files, the first account system can fill in those values providing, at least in part, translations to terms that the second and third account systems did not have translated.

Step 409 can be accomplished in several substeps. First, the first account system may store all translations of the first translation file to memory, for example, an array that matches a key to a language and further to a translation matching the key and language. A second sub-step can be the first account system matching each untranslated key of the peer translation terms to the translations in memory. This step can identify correct translations and fill them in accordingly to the translation files. A match can be to the string of a key without accounting for punctuation and capitalization. Each of the substeps can be performed in a loop that reviews each untranslated term of each translation file, until all untranslated terms are exhausted. Once translated in this manner, if there are more than one file, the files may be combined together to form a comprehensive file. A comprehensive file is a consensus file built from multiple translation files received from peer account systems.

Alternatively, if step 409 is reached by the negative branch of step 405, a consensus file is the product of step 409, since only a single peer's translation file is populated with matching translations from the first translation file.

Next, the first account system may determine if the consensus file has any untranslated terms (step 411). If it does, the first account system may extract untranslated terms from the consensus file (step 413). In other words, the first account system may apply search criteria to locate and select untranslated data from the consensus file to form translatable terms in an extracted consensus file. Untranslated data is an untranslated term within a language element that has a translation token in place of a correct translation for the key. In the examples given in FIG. 2C, the translation token is "null." Accordingly, a way to locate untranslated terms may be through the use of a regular expression, for example, using the Linux® command "grep." Linux® is a registered trademark of Linus Torvalds in the United States, other countries or both. A regular expression is criteria which describe a string. The regular expression can use literal characters, wild-card characters, conditional characters, or a combination of these to form the criteria. Thus, a suitable criterion can be "null."

Next, the first account system may transmit the extracted consensus file to a translation center (step 415). Next, the first account system may receive a translation of the extracted consensus file (step 417). Next, the first account system may integrate the translations to the consensus file to form a translated consensus file (step 419).

Following step 419, or a negative branch from step 411, the first account system may determine whether a comprehensive file was used (step 421). This step can be based on the determination of step 405 above. If step 421 is positive, the first account system may distribute the translated consensus file, which is a comprehensive file in this case, to peer account systems (step 433). Peer account systems can be, for example, account system 304 and production account systems 305 of FIG. 3. Otherwise, a negative determination may result in the first account system sending the translated consensus file to the second account system, alone (step 431). Processing may terminate thereafter.

Figure 5:
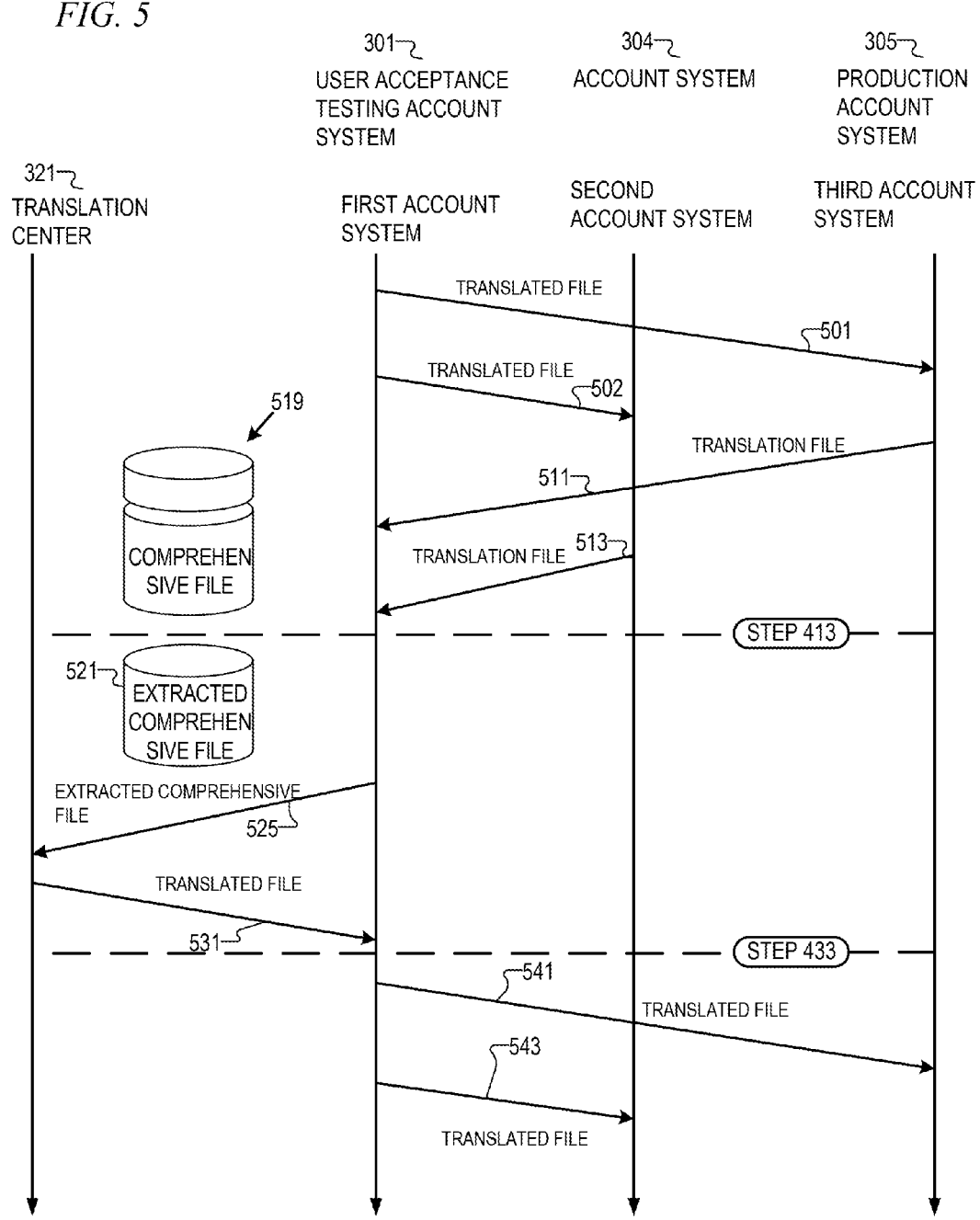
FIG. 5 is a communication diagram of files or messages passed among data processing systems in accordance with an illustrative embodiment of the invention.

FIG. 5 is a communication diagram of files or messages passed among data processing systems in accordance with an illustrative embodiment of the invention. Earlier times are at the top, and later times are at the bottom. The communication flows shown here are for an example where step 405, of FIG. 4 above, determines that other account systems, beyond the second account system, need translations and moreover, a determination at step 411 that a resulting consensus file, in this case a comprehensive file, continues to have untranslated terms.

The data processing systems that are transmitters or receivers of the files or messages are translation center 321, as in FIG. 3, first account system, second account system, and a third account system. In this example, the first account system can be user acceptance testing account system 301, as in FIG. 3. In this example, the second account system 304 can be account system 304 of FIG. 3. In this example, the third account system can be production account system 305 of FIG. 3.

Initially, the first account system forms a translated file, which it may transmit to two of its peers as translated file 501 and translated file 502. The peer account systems may determine that one or more terms are untranslated in the translation files associated with each peer. Accordingly, the peers may respond by transmitting their associated translation files, namely, translation file 511 associated with third account system, and translation file 513 associated with second account system.

The first account system may aggregate the translated file, and the two translation files into comprehensive file 519. Further, the first account system can remove any translated terms to form an extracted comprehensive file 521 as made, for example, in response to step 413, as in FIG. 4. The first account system may further transmit the extracted comprehensive file 521 to translation center 321.

Translation center 321 may respond by sending a translated file 531. First account system may apply step 433, as in FIG. 4, to distribute the translated file as translated file 541 to third account system and translated file 543 to the second account system.

Figure 6:
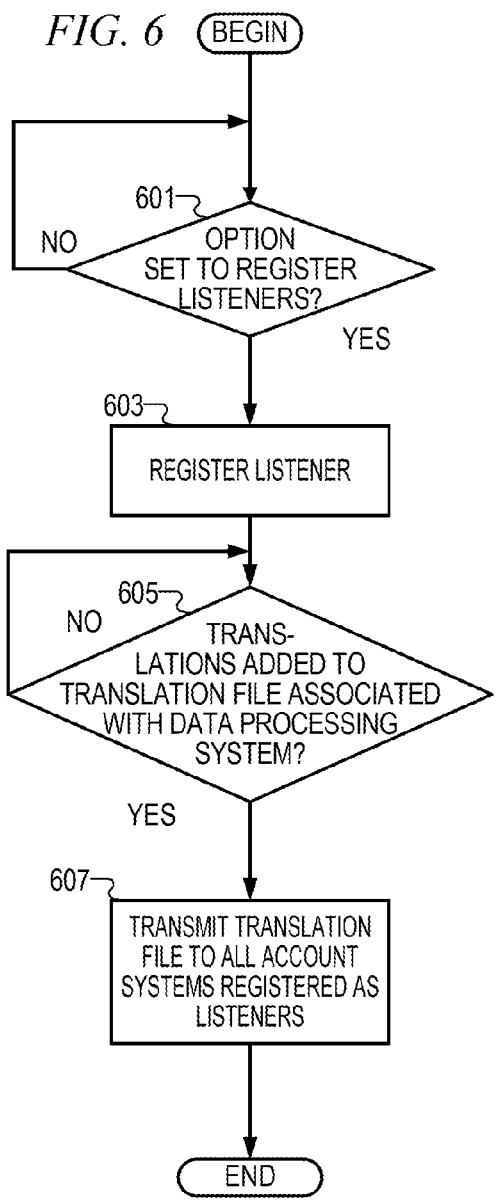
FIG. 6 is a flowchart for registering listeners in accordance with an illustrative embodiment of the invention.

FIG. 6 is a flowchart for registering listeners in accordance with an illustrative embodiment of the invention. The steps shown in this flowchart may be performed by a first account system or any other account system. For example, the steps of the flowchart may be performed subsequently to the steps of flowchart 400 of FIG. 4. Initially, the account system may determine whether an option is set to register listeners (step 601). A listener registration may be performed in several ways. The first way involves an administrator to configure a Java Messaging Service topic associated with a particular language. Accordingly, any subscribers to the topic can receive messages containing new translations in response to a peer account publishing translation data to the topic. Thus, the administrator configures the account systems to publish and subscribe messages concerning the topic.

An account system may subscribe to a specific language such as French. Alternatively, an account system can subscribe to a generic translation topic, and thus receive publications relating to all translations, regardless of the language. A listener is a data processing system supported application that performs actions in response to the occurrence of a predetermined event. For example, in a software application, listeners are often connected to buttons, such that whenever the button is clicked (i.e. the event occurs), a specific action is taken (i.e. saving a file, or displaying an image, or printing a page, etc). For the listener registration of step 601 new translations are loaded (the action taken) in response to one or more of the peer accounts publishing a new translation file to the topic (the event that occurs). Next, the account system may determine whether translations are added to a translation file associated with the account (data processing) system (step 605).

Negative determinations at step 605 may cause the account system to repeatedly execute step 605. However, in response to a positive determination, the account system may transmit its translation file to all account systems registered as listeners (step 607). Processing may terminate thereafter.

Figure 7:
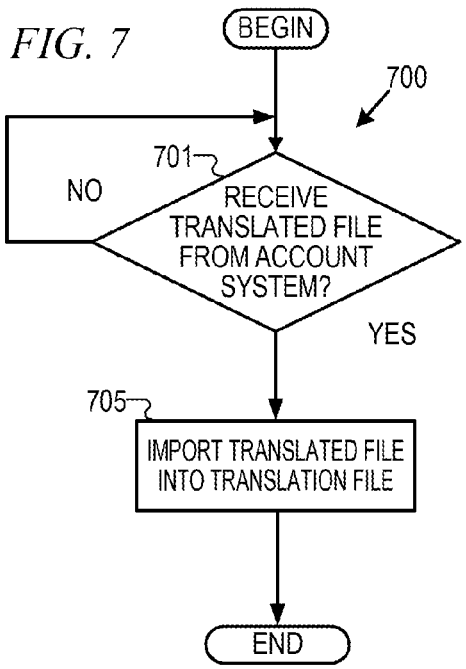
FIG. 7 is a flowchart for receiving translated files to an account system in accordance with an illustrative embodiment of the invention.

FIG. 7 is a flowchart for receiving translated files to an account system in accordance with an illustrative embodiment of the invention. The flowchart steps may be performed by an account system, which is a data processing system. The steps of flowchart 700 may be performed by an account system, for example, account system 304 of FIG. 3 that previously sent translation files to a first account system, for example, user acceptance testing account system 351 of FIG. 3. In this example, the account system may have sent a translation file, thereby indicating a need for translations.

Alternatively, flowchart 700 may be performed by an account system registered as a listener. In the steps described below, the account system performing the steps will be referred to as a listener. The listener may initially determine whether it has received a translated file from an account system (step 701). A negative determination can cause the listener to re-execute step 701. However, a positive determination may cause the listener to import the translated file into the translation file associated with the listener (step 705). Processing may terminate thereafter.

Accordingly, one or more embodiments may be arranged for an account system to solicit untranslated terms from its peers. Once untranslated terms arrive to the account system, the account system may consolidate untranslated terms into a consensus file, which may be a comprehensive file resulting from untranslated terms being present in multiple peer account systems. The account system can reduce the consensus file to carry only information relevant to the untranslated terms, and then forward such a file as an extracted comprehensive file to a translation center for further processing. The account system may receive translations from the translation center, and then distribute such translations among its peers. This activity may be triggered based on previous transmittals of untranslated terms from peers, or based on the peers being registered as listeners to a topic related to the translations.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for translating data, the method comprising:
   obtaining, via a network, a first language translation file associated with and used to translate data from a first account system;
   obtaining, via a network, a second language translation file associated with and used to translate data from a second account system;
   obtaining, via a network, a third language translation file associated with and used to translate data from a third account system;
   the third account system generating an account file and determining that the account file requires translation of a plurality of language terms that are not translated by the third translation file, and in response, the third account system translating the plurality of language terms from the account file using the first and second language translation files, and translating other terms of the account file using the third language translation file; and
   the third account system sending to the second account system the account file which has been translated using the first, second and third language translation files.

2. The method of claim 1, wherein translating comprises:
   selecting untranslated data from the account file, wherein untranslated data comprises an untranslated language term, within a language element, and a corresponding key in the account file;
   responsive to selecting untranslated data from the account file, transmitting the untranslated data to a translation center; and
   receiving from the translation center a translated file corresponding to the untranslated language terms.

3. The method of claim 2, wherein selecting untranslated data comprises using a regular expression to obtain translatable record comprising at least one untranslated language term corresponding to the key.

4. The method of claim 1, wherein translating comprises:
   determining whether the first language translation file has translations for all untranslated language terms of the account file; and
   responsive to a determination that the first language translation file has translations for all untranslated language terms of the account file, using each translation in place of each untranslated language term of the account file.

5. The method of claim 1, wherein translating comprises:
determining whether the first language translation file has translations for less than all untranslated language terms of the account file;
responsive to a determination that the first language translation file has translations for less than all untranslated language terms, using the translations in place of some untranslated account terms of the account file;
responsive to a determination that the first language translation file has translations for less than all untranslated language terms, transmitting remaining untranslated language terms to a translation center; and
receiving from the translation center the translated file corresponding to the remaining untranslated language terms.

6. The method of claim 5, wherein the translation center is a data processing system.

7. The method of claim 1, wherein the account file includes only one instance of a key and the key is a term, a column descriptor, an attribute name descriptor, and an object name descriptor.

8. A computer program product for providing reuse of translated data between systems, the program product comprising:
a computer readable storage device;
first program instructions to obtain, via a network, a first language translation file associated with a first account system;
second program instructions to obtain, via a network, a second language translation file from a second account system, wherein the second account system is a data processing system;
third program instructions to obtain, via a network, a third language translation file associated with and used to translate data from a third account system;
fourth program instructions to generate an account file and determine that the account file requires translation of a plurality of language terms that are not translated by the third language translation file, and in response, translate the plurality of language terms from the account file using the first and second language translation files, and translate other terms of the account file using
the third language translation file;
fifth program instructions to send to the second account system the account file which has been translated using the first, second and third language translation files, wherein the first, second, third, fourth and fifth program instructions are stored on the computer readable storage device.

9. The computer program product of claim 8, wherein fourth program instruction to translate further comprise:
eighth program instructions to select untranslated data from the account file, wherein untranslated data comprises an untranslated language term, within a language element, and a corresponding key in the comprehensive file;
ninth program instructions to transmit the untranslated data to a translation center, responsive to selecting untranslated data from the account file; and
tenth program instructions to receive from the translation center a translated file corresponding to the untranslated language terms; wherein the eighth, ninth, and tenth program instructions are stored on the computer readable storage device.

10. The computer program product of claim 9, wherein the account file includes only one of a key, wherein the key is a term, a column descriptor, an attribute name descriptor, and an object name descriptor, and wherein selecting untranslated data comprises using a regular expression to obtain translatable record comprising at least one untranslated language term corresponding to the key.

11. The computer program product of claim 8, wherein fourth program instruction to translate further comprise:
eighth program instructions to determine whether the first language translation file has translations for all untranslated language terms of the comprehensive file; and
ninth program instructions to use each translation in place of each untranslated language term of the account file, responsive to a determination that the first language translation file has translations for all untranslated language terms of the account file; wherein the eighth and ninth program instructions are stored on the computer readable storage device.

12. The computer program product of claim 8, wherein fourth program instruction to translate further comprise:
eighth program instructions to determine whether the first language translation file has translations for less than all untranslated language terms of the account file;
ninth program instructions to use the translations in place of some untranslated terms of the account file, responsive to a determination that the first language translation file has translations for less than all untranslated language terms;
tenth program instructions to transmit remaining untranslated language terms to a translation center, responsive to a determination that the first language translation file has translations for less than all untranslated language terms; and
eleventh program instructions to receive from the translation center the translated file corresponding to the remaining untranslated language terms; wherein the eighth, ninth, tenth, and eleventh program instructions are stored on the computer readable storage device.

13. The computer program product of claim 12, wherein the translation center is a data processing system.

14. The computer program product of claim 8, wherein the account file includes only one of a key, wherein the key is a term, a column descriptor, an attribute name descriptor, and an object name descriptor.

15. A computer system for translating data, the system comprising:
a processor, a computer readable memory and a computer readable storage device;
first program instructions to obtain, via a network, a first language translation file associated with a first account system;
second program instructions to obtain, via a network, a second language translation file from a second account system, wherein the second account system is a data processing system;
third program instruction to obtain, via a network, a third language translation file associated with and used to translate data from a third account system;
fourth program instruction to generate an account file and determine that the account file requires translation of a plurality of language terms that are not translated by the third language translation file, and in response, translate the plurality of language terms from the account file using the first and second language translation files, and translate other terms of the account file using
the third language translation file
fifth program instructions to send to the second account system the account file which has been translated using the first, second and third language translation files, wherein the first, second, third, fourth and fifth program instructions are stored on the computer readable storage device for execution by the processor via the computer readable memory.

16. The computer system of claim 15, wherein fourth program instruction to translate further comprise:

eighth program instructions to select untranslated data from the account file, wherein untranslated data comprises an untranslated language term, within a language element, and a corresponding key in the account file;

ninth program instructions to transmit the untranslated data to a translation center, responsive to selecting untranslated data from the account file; and tenth program instructions to receive from the translation center a translated file corresponding to the untranslated language terms; wherein the eighth, ninth, and tenth program instructions are stored on the computer readable storage device for execution by the processor via the computer readable memory.

17. The computer system of claim 15, wherein the account file includes only one of a key, wherein the key is a term, a column descriptor, an attribute name descriptor, and an object name descriptor, and wherein selecting untranslated data comprises using a regular expression to obtain translatable record comprising at least one untranslated language term corresponding to the key.

18. The computer system of claim 15, wherein fourth program instruction to translate further comprise:

eighth program instructions to determine whether the first language translation file has translations for all untranslated language terms of the account file; and ninth program instructions to use each translation in place of each untranslated language term of the account file, responsive to a determination that the first language translation file has translations for all untranslated language terms of the account file; wherein the eighth and ninth program instructions are stored on the computer readable storage device for execution by the processor via the computer readable memory.

19. The computer system of claim 15, wherein fourth program instruction to translate further comprise:

eighth program instructions to determine whether the first language translation file has translations for less than all untranslated language terms of the account file;

ninth program instructions to use the translations in place of some untranslated language terms of the account file, responsive to a determination that the first language translation file has translations for less than all untranslated language terms;

tenth program instructions to transmit remaining untranslated language terms to a translation center, responsive to a determination that the first language translation file has translations for less than all untranslated language terms; and eleventh program instructions to receive from the translation center the translated file corresponding to the remaining untranslated language terms; wherein the eighth, ninth, tenth and eleventh program instructions are stored on the computer readable storage device for execution by the processor via the computer readable memory.

20. The computer system of claim 19, wherein the translation center is a data processing system.

* * * * *